US00RE37453B1

(19) United States
(12) Reissued Patent
Utmatsu et al.

(10) Patent Number: US RE37,453 E
(45) Date of Reissued Patent: Nov. 27, 2001

(54) INK JET PRINT HEAD

(75) Inventors: Ryosuki Utmatsu; Junichi Suetsugu; Kazuo Shima; Minoru Yamada; Yoshihiro Hagihara; Junichi Fujisawa, all of Tokyo (JP)

(73) Assignee: NEC Corporation, Tokyo (JP)

(21) Appl. No.: 09/548,651

(22) Filed: Apr. 13, 2000

Related U.S. Patent Documents

Reissue of:
(64) Patent No.: 5,880,761
Issued: Mar. 9, 1999
Appl. No.: 08/549,053
Filed: Oct. 27, 1995

(30) Foreign Application Priority Data

Oct. 28, 1994 (JP) ..... 6-265294

(51) Int. Cl.[7] ..... B41J 2/05
(52) U.S. Cl. ..... 347/56
(58) Field of Search ..... 347/56, 61, 62, 347/65

(56) References Cited

U.S. PATENT DOCUMENTS 5,202,659 * 4/1993 DeBonte et al. ..... 347/11
5,389,962 * 2/1995 Sekiya et al. ..... 347/65
5,420,618 * 5/1995 Sekiya et al. ..... 347/9
5,657,060 * 8/1997 Sekiya et al. ..... 347/15

* cited by examiner

*Primary Examiner*—Peter S. Wong
*Assistant Examiner*—Gregory J. Toatley, Jr.
(74) *Attorney, Agent, or Firm*—Ostrolenk, Faber, Gerb & Soffen, LLP

(57) ABSTRACT

An ink jet print head comprises a substrate formed with a heating resistor, an ink path defining member for defining an ink supply path, and an orifice plate, and in the orifice plate, there is formed an ink outlet at the position opposing the heating resistor. Further, a heating zone surrounding the heating resistor is formed at the position corresponding to the heating resistor of the ink supply path. The channel resistance of the ink supply path is set so that a relationship is established between a quantity q of the discharged ink drop, a sectional area A of the ink outlet, and a maximal projection h that a meniscus of the ink has when it projects from the ink outlet after it has restored the exit level from a retreat position it had after the drop of the ink had been discharged such that [$0<h<0.3q/A$] $0<h<0.25q/A$. Consequently, there is obtained a high-speed printing of high quality without dispersion.

20 Claims, 9 Drawing Sheets

FIG. 11

| | DIAMETER OF INK OUTLET (μm) | QUANTITY OF INK, q (pl) | REQUIRED TIME FOR MENISCUS TO FIRST RETURN TO ORIFICE PLATE SURFACE LEVEL, $t_1$ (μs) | MAX. PROJECTION OF MENISCUS, h (μm) | MAX. FREQUENCY FOR PRINTING WITHOUT DISPERSION, f |
|---|---|---|---|---|---|
| PRESENT EMBODIMENT | MIN 63 | 130 | 135 | 10 | 6.5 |
| | MAX 70 | 130 | 135 | 7 | 7.2 |
| | | | | | |
| CONVENTIONAL EXAMPLE | 55 | 130 | 220 | 14 | 4.0 |

INK JET PRINT HEAD

Matter enclosed in heavy brackets [ ] appears in the original patent but forms no part of this reissue specification; matter printed in italics indicates the additions made by reissue.

BACKGROUND OF THE INVENTION

The present invention relates to an ink jet print head for discharging ink drops from ink outlets by use of thermal energy.

Description of the Related Art

Recently, in contrast with the wire dot printing methods, non-impact recording method is attracting interest became the recording noise level is negligible. In particular, an ink et recording method is attractive as it permits high-speed recording on ordinary paper without the need of a deposition treatment on the paper side. In the field, therefore, aiming at an optimal ink discharge performance, various approaches have been made, with associated implementations.

In the ink jet recording method, a recording is effected with discharged droplets of recording liquid, called "ink" deposited on a recordable material. This method is categorized into several systems according to the manner in which the drops of recording liquid are formed.

FIG. 1 illustrates a bubble jet recording system as a conventional example. The conventional system includes a substrate 32 provided with a heating resistor 30, a channel plate member 36 for defining an ink supply path 34, and an orifice plate 40 formed with an orifice as an ink outlet 38 communicating with the ink supply path 34. The heating resistor 30 rapidly heats to vaporize a volume of ink supplied on a heating zone surrounding the resistor 30, causing ink bubbles 42 to grow, exerting pressures therearound so that an ink drop is discharged from the ink outlet 38, with trailing droplets 50, 52 as shown in FIG. 2.

Grown bubbles 42 become deflated as they are cooled by surrounding ink, and fade out with ink vapour therein condensed to be liquidated.

A consumed volume of ink by the discharge is supplemented from an ink pool through the ink supply path 34, due to capillary forces acting on an ink meniscus 44 retreating inside the ink outlet 38.

To permit a high-speed recording, it is desirable to repeat a discharge of an ink drop in a short period, supplementing at a high speed a volume of ink consumed during every discharge through the ink outlet 38.

In a conventional implementation, the diameter of the ink outlet 38 is reduced to have an increased capillary force, and the channel resistance of the ink supply path 34 is reduced.

Thus, ink is supplemented at an increased speed, and with an increased momentum, which causes, as shown in FIG. 1, an elongated ink pillar 46 to project from the ink outlet 38, before it deforms into an ink drop. In the deformation, the elongated ink pillar 46 is broken so that a leading upper portion is changed into a main drop 48 and a trailing lower portion is separated into a number of relatively large low-speed satellites 50, 52 such as in FIG. 2. Such satellites adversely affect the printing.

Moreover, as a volume of ink is supplemented with an increased momentum, as shown in FIG. 3, an ink meniscus 44 at a top end of the ink outlet 38 has an increased tendency to convex outside and concave inside of the outlet 38. The meniscus 44 thus vibrates with a reduced damping ratio. That is, the vibration of the meniscus 44 is not readily stopped.

As the ink discharge is repeated in a short period, a subsequent discharge occurs immediately after the supplement of ink, so that it may occur when the ink meniscus 44 starts convexing above the ink outlet. This causes an undesirable deformation of an ink drop and an undesirable development of low-speed satellites, resulting in a reduced quality of recording.

Further, some volume of ink may flood over a surface area around the ink outlet 38, causing an ink drop to be discharged in an oblique direction, or bubbles to be involved, stopping the discharge, with a reduced reliability of recording.

A probable solution to such problems may include entering subsequent discharge after a sufficient damping of vibration, which however is inconsistent with an intended high-speed recording.

The present invention has been achieved with such points in mind.

SUMMARY OF THE INVENTION

It therefore is an object of the present invention to provide an ink jet print head with criteria such as on an sectional area of an ink outlet and a fluid resistance of an ink supply path to achieve an optimal high-speed ink discharge with an increased reliability and an improved cost effect, without additional elements.

In the present invention, an ink outlet is tapered, with a gradually reduced diameter, toward an orifice plate surface. Supposing a straight aperture of a diameter, it is typical that the quantity Q of an ink drop discharged from a print head of an identical resolution is substantially identical, as well as the volume of a void defined by an ink outlet and an ink meniscus drawn back therein just after a discharge of an ink drop, i.e., the quantity $Q_r$ of ink to be supplemented.

Letting $t_r$ be a time for the drawn back ink meniscus to restore to an exit level of the ink outlet, and v be a mean flow velocity in the ink outlet, $$v=Q_r/(A\cdot t_r),$$

Letting ρ be an ink density, and M be a mean momentum per unit volume, $$M=\rho\cdot Q_r/(A\cdot t_r),$$

Thus, the larger the diameter of the ink outlet is, the smaller the mean momentum becomes, with a reduced frequency of occurrence of an overshooting ink meniscus.

As the overshooting meniscus convexes like a paraboloid of revolution, letting $Q_o$ be an overshooting volume of ink and h be an overshooting height or projection of ink, $$h=2\cdot Q_o/A.$$

Thus, the larger the diameter of the ink outlet is, the smaller the overshooting volume of ink becomes.

For a quantity of ink supplemented in a time the larger the diameter of the ink outlet is, the overshooting ink might have the smaller projection h. However, experiments showed that the projection h of an ink overshoot depends on a sectional configuration of the ink supply path, i.e., a channel resistance or flow resistance thereof.

This fact means that an optimized relationship between an ink outlet sectional area and a channel resistance permits a high-speed recording without low-speed satellites.

The inventors found that a subsequent discharge of ink immediately after a concaved meniscus of the ink has restored to an exit level of an ink outlet can be free from an undesirable deformation of a drop of the ink, when an overshooting height or projection h of the ink falls within a range such that:

$$[0<h<0.3(q/A),]\ 0<h<0.25(q/A),$$

where q is a quantity in volume of the ink drop, and A is a sectional area at the exit level of the ink outlet.

The present invention is based on this fact.

Thus, to achieve the object, a genus of the present invention provides an ink jet print head comprising a substrate member formed with a heating resistor, an ink path defining member provided on the substrate member, for defining an ink supply path including a heating zone in a vicinity of the heating resistor, and an orifice plate member formed with an ink outlet communicating with the ink supply path and laminated on the substrate member, with the ink path defining member interposed therebetween, the ink jet print head generating heat from the heating resistor to discharge a drop of ink from the ink outlet, the ink supply path having a fluid resistance so that a relationship is established such that $[0<h<0.3(q/A)]$ $0<h<0.25(q/A)$, where q is a quantity o the drop of the ink, A is a sectional area at an exit level of the ink outlet, and h is a maximumal projection that a meniscus of the ink has when it projects from the ink outlet after it has restored the exit level from a retreat position it had after the drop of the ink had been discharged.

According to a species of the genus of the invention, the relationship is established such that:

$$\pi\{(3q)/(4\pi))^{2/3} \leqq A \leqq \pi(3q)/(2\pi)\}^{2/3}.$$

This is because of the following reason.

An undesirable overshooting height becomes smaller as the ink outlet has an increased diameter. The ink outlet diameter may preferably be increased.

If the ink outlet has a small diameter, a volume of ink extruded to be discharged therefrom constitutes an elongated ink pillar, which has a reduced tendency to be deformed to constitute an ink drop due to surface tensile forces of the ink so that it is ruptured into droplets, thus causing satellite drops to degrade a print quality.

To avoid such a rupture, letting d be a diameter of an ink outlet and D be a diameter of an expected ink drop, it is preferable that:

$$d \geqq D \quad \text{(a).}$$

Letting q be a volume of the ink drop, $$q=(4\pi/3)(D/2)^2 \quad \text{(b).}$$

Thus, letting A be a transverse sectional area of the ink outlet, it so follows that:

$$A=\pi(D/2)^2 \quad \text{(c).}$$

From the expressions (a), (b) and (c), $$A \geqq \pi\{(3q)/(4\pi))\}^{2/3} \quad \text{(d).}$$

On the other hand, if the ink outlet diameter is excessively large, a discharged ink drop has a reduced velocity with a reduced momentum susceptible to disturbances, causing an ink flying direction to be deviated or an air bubble to be involved.

To ensure a normal ink flying direction, it is preferable for the ink outlet to function as a nozzle for extruding a volume of ink in a direction normal to an orifice plate so that a lateral side of the extruded ink is perpendicular to a top surface of the orifice plate, which means the extruded ink has a volume q equivalent to or larger than a volume of a hemisphere having the same diameter d as the ink outlet.

It thus so follows that:

$$q \geqq (4\pi/3)(d/2)^3 \times ½ \quad \text{(e).}$$

From the expressions (c) and (e), $$A \leqq \pi\{(3q)/(2\pi))\}^{2/3} \quad \text{(f).}$$

Thus, from the expressions (d) and (f), $$\pi\{(3q)/(4\pi))\}^{2/3} < A < \pi\{(3q)/(2\pi))\}^{2/3} \quad \text{(g).}$$

The ink outlet may have an arbitrary sectional form other than a cicle, e.g. it may have a polygonal section. The expression (g) is applicable also to such an arbitrary form, as it has a mean sectional area when assumed as a circle equivalent in area.

According to another species of the genus of the invention, another relationship is established such that $0.9\times t_1<t_{min}<1.1\times t_1$, where $t_1$, is a time for the meniscus of the ink to restore to the exit level from the retreat position, and $t_{min}$ is a minimal period by which the ink jet print head discharges the drop of the ink.

According to the present invention, after an ink drop is discharged from an ink outlet by grown bubbles, the projection of a meniscus at ink refill is kept small by optimizing the channel resistance value of an ink supply path.

Therefore, the periodic damping time of the meniscus becomes short, and the unfavorable effect to be caused at the subsequent discharge is avoided.

Moreover, in the case in which the sectional area of the ink outlet is set large within the predetermined range, the projection of the meniscus at ink refill becomes small, and the damping time of the vibration of the meniscus becomes short.

Further, in a constitution in which the relation between the restoring time of the meniscus and the minimum driving period of a print head is set within the predetermined range, no dead time exists before the subsequent discharge without an undesirable deformation of the discharged ink drop, and the discharge interval becomes short.

BRIEF DESCRIPTION OF THE DRAWINGS

The objects, features and advantages of the present invention will become more apparent from consideration of the following detailed description, taken in conjunction with the accompanying drawings, in which:

FIG. 11 is a table describing the difference between the embodiment shown in FIG. 5 and the conventional example.

DESCRIPTION OF THE PREFERRED EMBODIMENT

Figure 1:
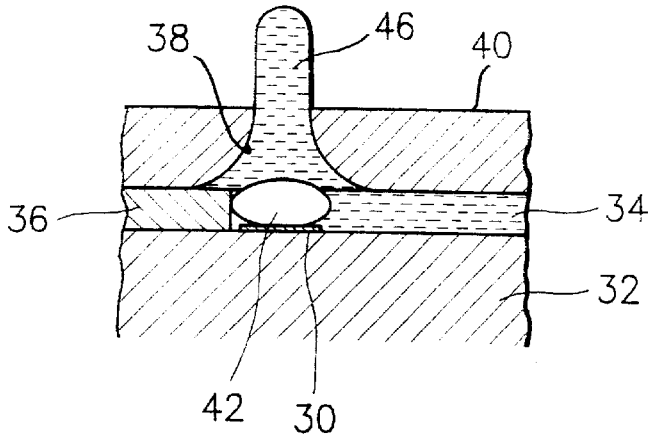
FIG. 1 PRIOR ART
FIG. 1 is a cross section of a prior art discharge device showing the state before a discharge of an ink drop.
Figure 2:
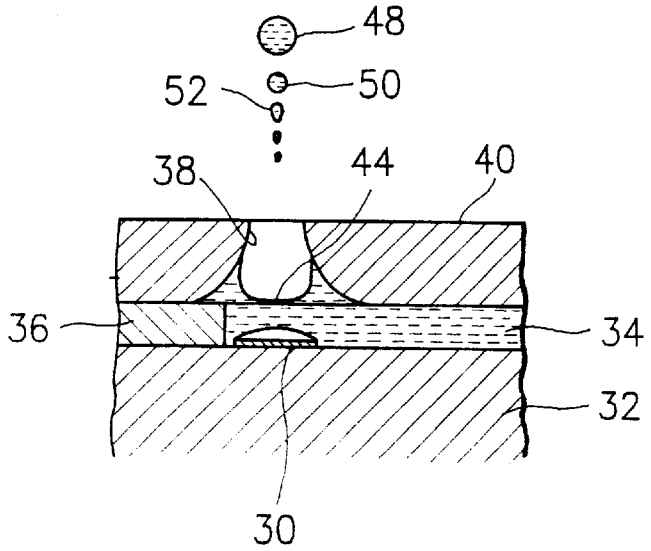
FIG. 2 PRIOR ART
FIG. 2 is a cross section of the prior art device of FIG. 1 showing the state after a discharge of an ink drop.
Figure 3:
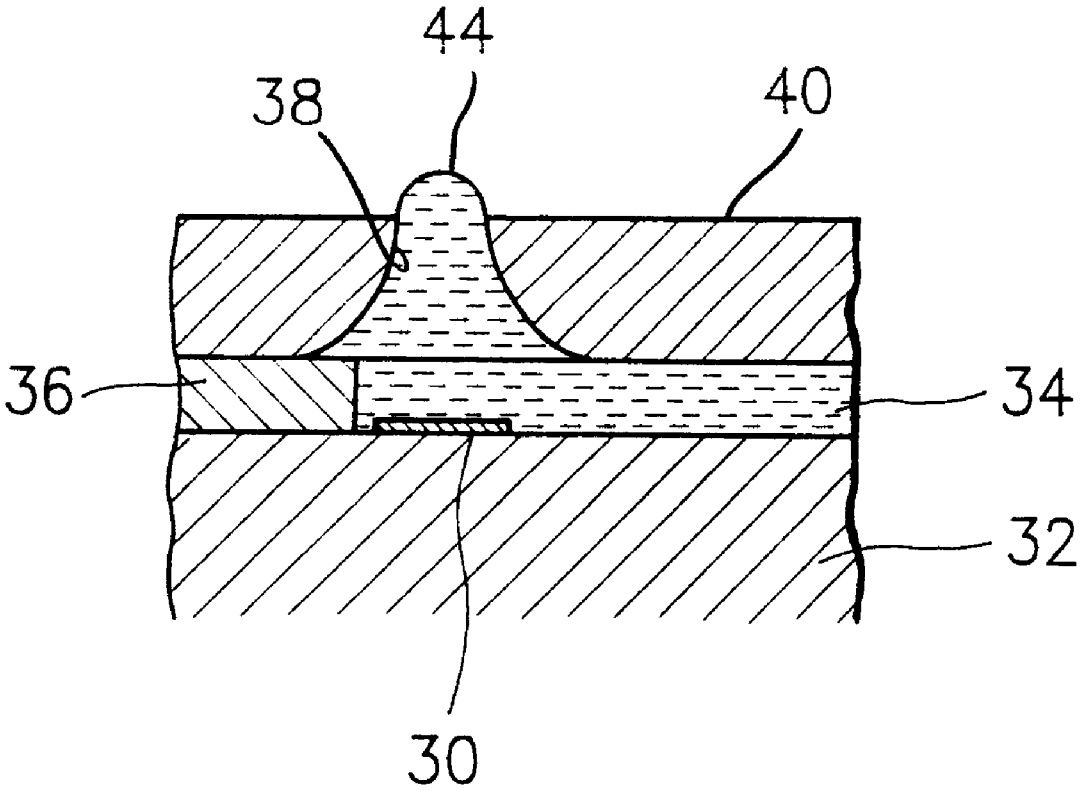
FIG. 3 PRIOR ART
FIG. 3 is a cross section of the prior art device of FIG. 1 showing the maximal projection of an ink meniscus.

Detailed below is a preferred embodiment of the present invention, with reference to FIGS. 4 to 11. Like members are designated by like reference characters.

Figure 4:
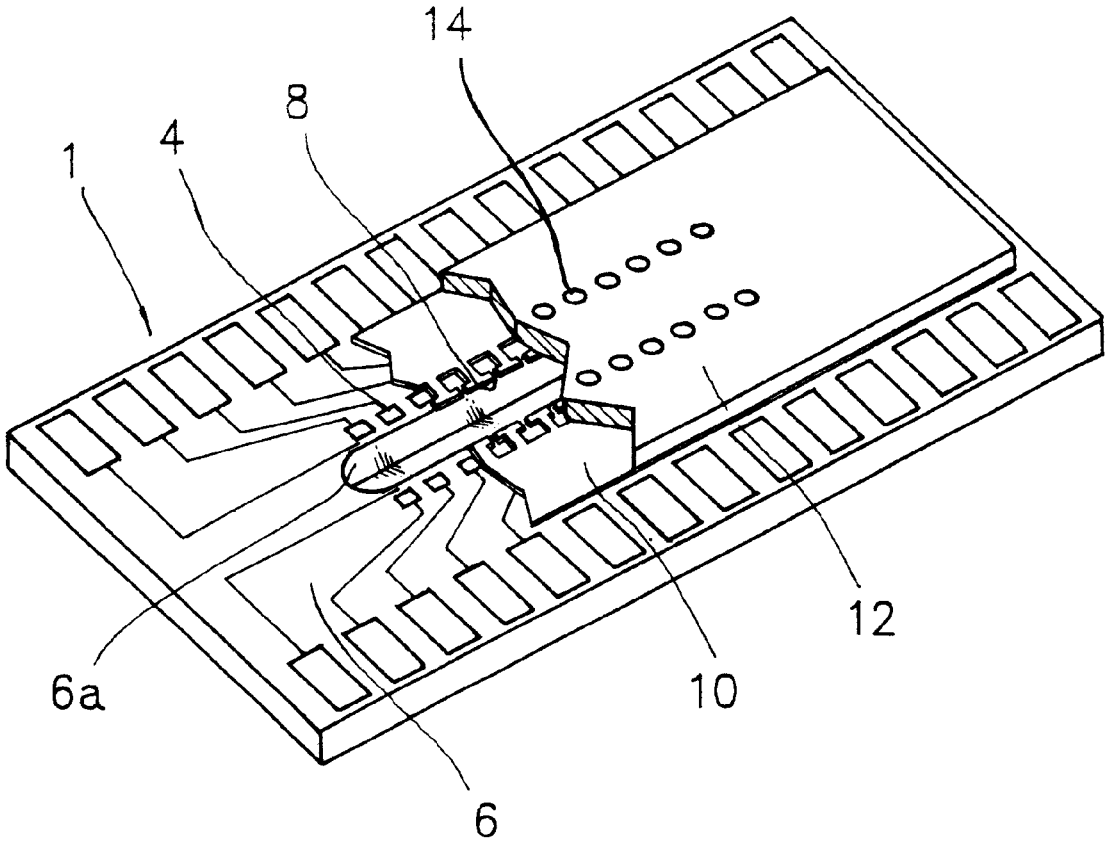
FIG. 4 is a perspective view of an ink jet print head according to an embodiment of the present invention.

Referring now to FIG. 4, an ink jet print head 1 according to an embodiment of the invention comprises a substrate 6 formed with a plurality of heating resistors (hereafter collectively "heating resistor") 4 and a central recess or groove 6a used as an ink pool or trunk path. An ink path defining resin sheet member 10 defines a plurality of channels as branched ink supply paths (hereafter collectively "ink supply path") each including a heating zone. An orifice plate 12 is formed with a plurality of orifices or nozzles as ink outlets 14 (hereafter collectively "ink outlet").

Figure 5:
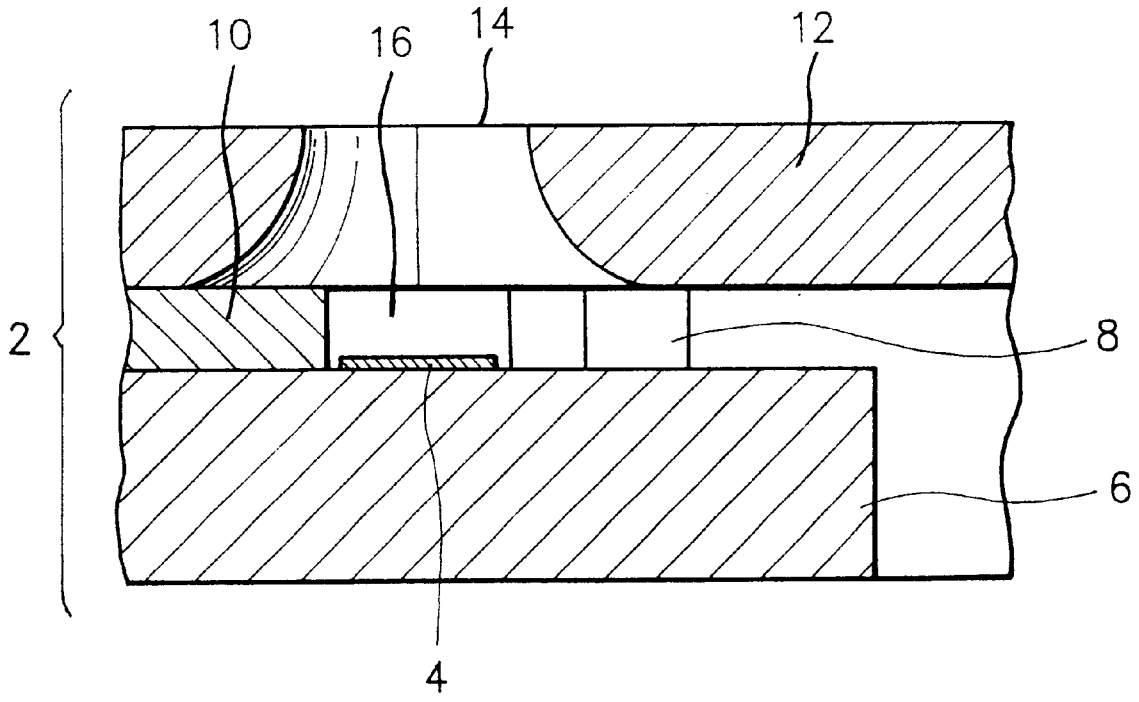
FIG. 5 is a cross section view showing an embodiment of the present invention.
Figure 6:
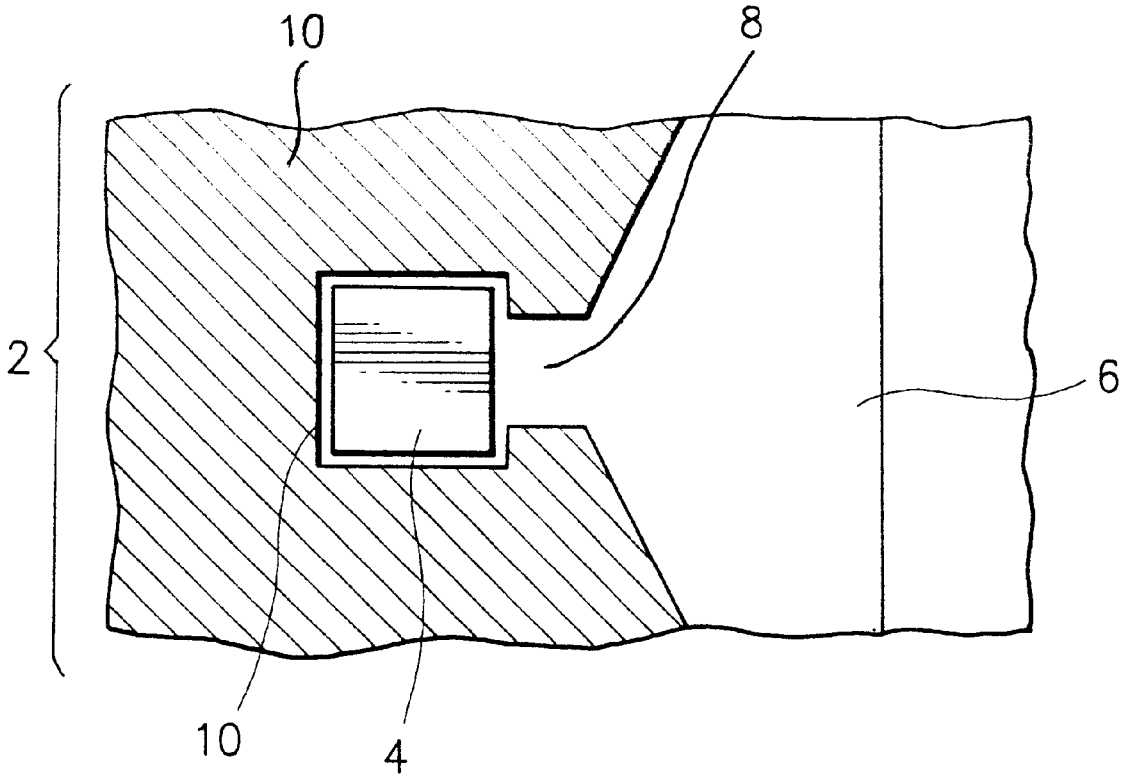
FIG. 6 is a plan view of the device of FIG. 4 in which the orifice plate is removed.

FIG. 5 shows a cross sectional view of a nozzle of an ink jet print head (multi-nozzle) identical to the print head 1. FIG. 6 shows a plan view of Ie ink jet print head with an orifice plate removed.

An ink jet print head 2 is provided with a substrate 6, a heating resistor 4, an ink path defining member 10 defining an ink supply path 8, and an orifice plate 12 laminated on the substrate 6 with the ink path defining member 10 interposed therebetween. An ink outlet 14 is formed on the orifice plate 12 at the position opposing the heating resistor 4. Further, the ink supply path 8 includes a heating zone 16 in a vicinity of the heating resistor 4, surrounding the resistor 4. Although not shown, the heating resistor 4 is connected to a power supply electrode and to a common electrode so that it can be heated by exterior driving pulses.

Next, a discharge operation of the ink jet print head 2 will be described with reference to FIGS. 7 to 9.

In the embodiment, the channel resistance of the ink supply path 9 is set so that a relationship is established between a quantity q of a discharged ink drop, a sectional area A of the ink outlet, and a maximal projection h that a meniscus of the ink has when it projects from the ink outlet 14 after it has restored to the exit level from a retreat position it had after the drop of the ink had been discharged (FIG. 9), such that [$0<h<0.3q/A$,] $0<h<0.25q/A$, more specifically, $h=0.2\ q/A$.

Further, between the quantity q of an ink drop and the sectional area A of the ink outlet 14 a setting is made such that:

$$\pi\{(3q)/(4\pi)\}^{2/3} \leqq A \leqq \pi\{(3a)/(2q)\}^{2/3}.$$

Figure 7:
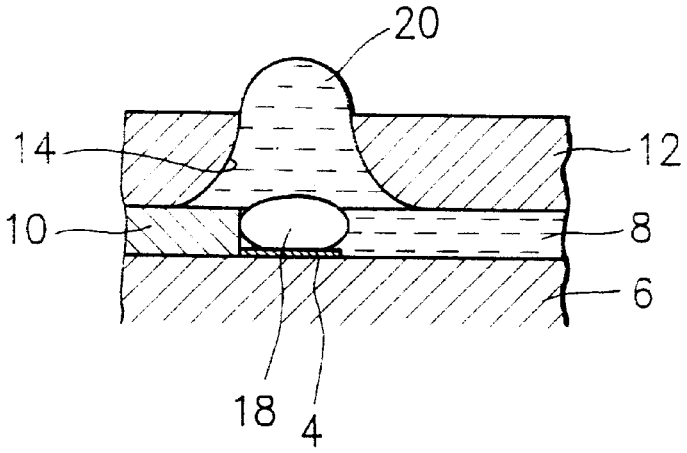
FIG. 7 is a cross section of a discharge device according to the present invention; showing the state before a discharge of an ink drop.

When a driving pulse is applied between the individual electrode and the common electrode to heat the heating resistor 4, the ink above the heating resistor 4 is rapidly heated and boiled, and as a result, a bubble 18 (as a collective term of bubbles) is developed from vapours of ink components as shown in FIG. 7. The bubble 18 extrudes the ink above it out from the ink outlet 14, thereby forming an ink pillar 20.

The condition "$\pi\{(3q)/(4\pi)\}^{2/3} \leqq A$" means that the diameter of the ink outlet 14 is larger than that of an ink drop which provides an intended ink drop quantity. Therefore, the ink pillar 20 will not elongate, but is formed into a combination of an ink drop 22 and negligible droplets, as shown in FIG. 8. Accordingly, an excellent printing quality without dispersion or scattering is obtained.

If the diameter of the ink outlet 14 is unnecessarily large, the flow velocity of the ink at a discharge of an ink drop becomes slow. Therefore, the velocity or the momentum of an ink drop becomes slow or small, with increased influences of disturbances. Further, as the nozzle action for the discharge of ink drops from the ink outlet 14 becomes less effective, the discharge direction of an ink drop becomes irregular, which causes an irregular deposition of ink drops on the target paper. As a result, a deterioration is caused in the printing quality.

However, since the present embodiment operates under the condition "$A \leqq \pi\{(3q)/(2\pi)\}^{2/3}$", that is, the diameter of the ink outlet 14 is smaller than that of a hemisphere which provides an expected ink drop quantity, the side surface of the ink pillar 20 becomes right angled to the surface of the orifice plate 12. Consequently, the ink outlet 14 functions as a nozzle free of irregularities in the spattering direction of an ink drop.

Figure 8:
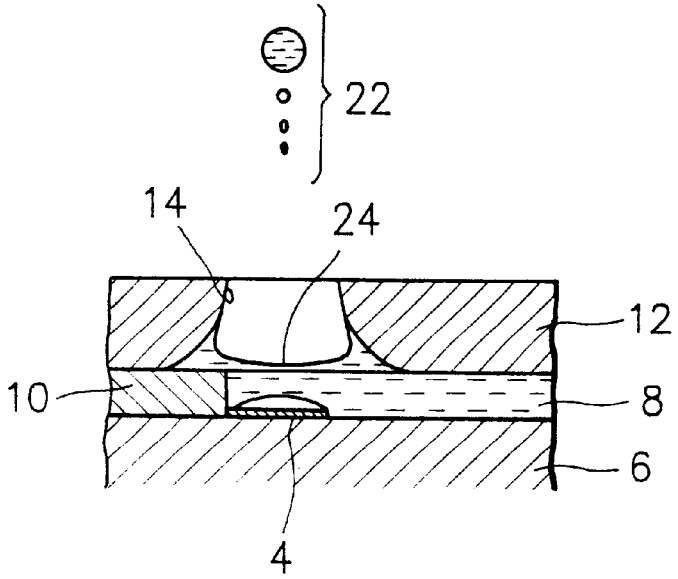
FIG. 8 is a cross section of the device of FIG. 7 showing the state after a discharge of an ink drop.
Figure 9:
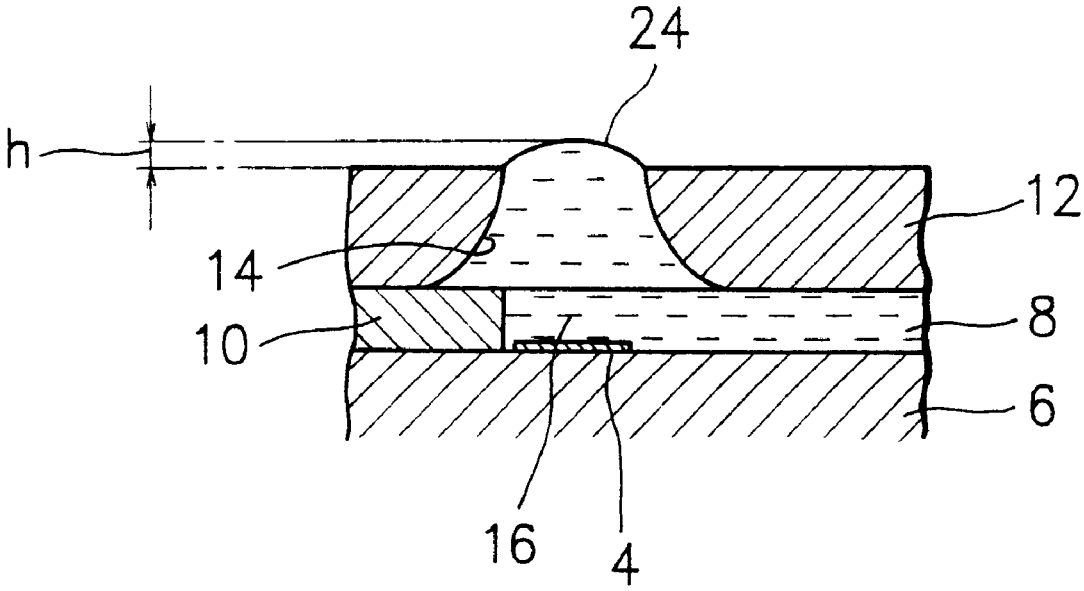
FIG. 9 is a cross section of the device of FIG. 7 showing the maximal projection of an ink meniscus.

After formation of the ink pillar 20, the internal pressure and temperature begin to fall due to the cooling effect of the adiabatic expansion and surrounding ink, and the bubble 18 starts to contract, as shown in FIG. 8. As described above, the ink pillar 20 is changed into an ink drop 22 to be discharged toward the recording medium, while the ink meniscus 24 is drawn inside the ink outlet 14.

Then, the ink meniscus 24 recovers, heading toward the exit level of the ink outlet 14, driven by a capillary force, which is a resultant force of the surface tension. Due to the inertial force of the ink, the ink meniscus 24 reaches the exit level of the ink outlet 14, and although the capillary force is gone, the meniscus 24 does not stop instantly but projects out from the exit level of the ink outlet 14, as shown in FIG. 9.

However, since the channel resistance value is set as to meet the condition "$h=0.2q/A$" in the present embodiment, although the ink is supplemented at high-speed, the projection h is considerably smaller as compared to the prior art. Therefore, even though a sequential discharge is executed immediately after the arrival of the ink meniscus 24 to the exit level, there is neither an undesirable deformation of an ink drop nor development of low-speed satellites. Moreover, since an ink overflow hardly occurs, there is no deterioration in the printing quality caused by the irregularity in the discharge direction, and also, no discharge error is caused by a bubble.

Figure 10:
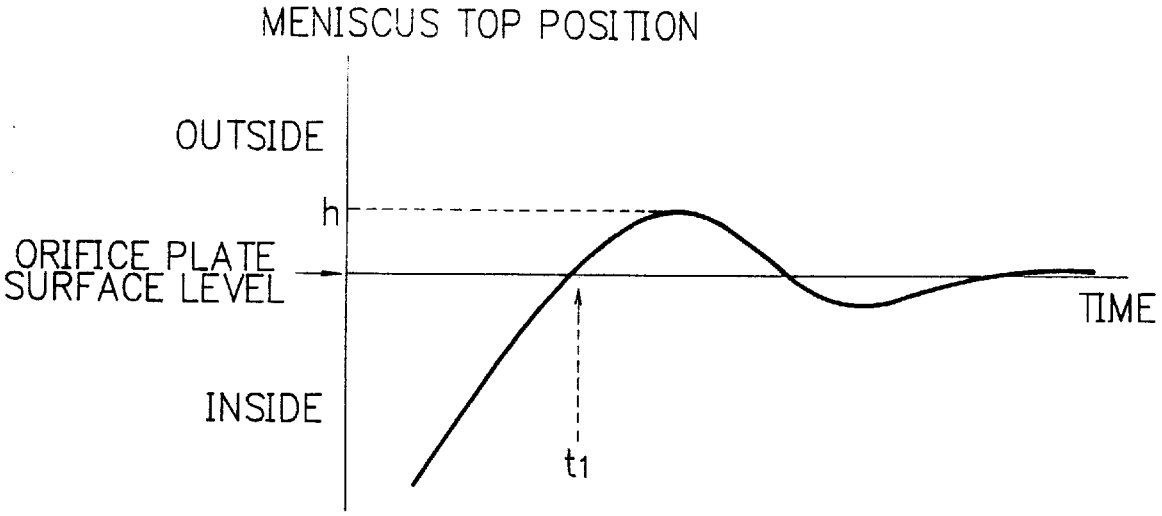
FIG. 10 is a graph showing a damping state of an ink meniscus.

Further, since the projection h of the ink meniscus 24 is considerably smaller as compared to the prior art, the periodic damping time of the meniscus 24 becomes extremely short as shown in FIG. 10, and thereby the unfavorable effect of the vibration to be caused at the subsequent discharge is avoided. In the figure, $t_1$ represents the time for the ink meniscus 24 to reach the exit level of the ink outlet 14.

Therefore, by driving the ink jet print head 2 under the condition of $0.9\times t_1<t_{min}<1.1\times t_1$, in which $t_1$ represents a time for the ink meniscus 24 to reach the exit level of the ink outlet 14 and $t_{min}$ represents a minimum operation period of the ink jet print head 2, the discharge interval is minimized with the excellent discharge performance kept, and as at result, a high-speed printing is achieved.

With the constitution described above, the measurement data of the present embodiment is compared with that of the conventional case as shown in FIG. 11.

As it is clear from FIG. 11, according to the ink jet print head of the present embodiment, a printing without dispersion is permitted in high-speed, which is almost twice the speed of the conventional print head.

*Preferably, for the MIN value, where the diameter of the ink outlet 14 is 63 μm, a relationship is established such that* $0<h<0.24\ (q/A)$, *and for the MAX value, where the diameter of the ink outlet 14 is 70 μm, a relationship is established such that* $0<h<0.21\ (q/A)$.

While each associated member is illustrated in a particular shape in the embodiment, be present invention is not to be restricted by them, for example, the shape of the ink outlet 14 can be defined to a polygon or other. As long as the above-mentioned condition is satisfied, the elements are permitted to be property selected and exchanged.

According to the present invention, there is provided an excellent ink jet print head which enables a non-dispersed high-speed printing without additional members or devices.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. An ink jet print head comprising:

a substrate member formed with a heating resistor;

an ink path defining member provided on the substrate member, for defining an ink supply path including a heating zone in a vicinity of the heating resistor; and an orifice plate member formed with an ink outlet communicating with the ink supply path and [laminated on the substrate member, with the ink path defining member interposed therebetween] *coupled to the ink path defining member*, said ink jet print head generating heat from the heating resistor to discharge a drop of ink from the ink outlet, said ink supply path having a fluid resistance so that a relationship is established such that:

$$[0<h<0.3(q/A)]\ 0<h<0.25(q/A),$$

where q is a quantity of the drop of the ink, A is a sectional area at an exit level of the ink outlet, and h is a maximumal projection that a meniscus of the ink has when it projects from the ink outlet after it has restored the exit level from a retreat position it had after the drop of the ink had been discharged.

2. An ink jet print head according to claim 1, wherein another relationship is established such that:

$$\pi\{(3q/4\pi)\}^{2/3}\leqq A<\pi\{(3q/2\pi)\}^{2/3}.$$

3. An ink jet print head according to claim 1, wherein another relationship is established such that:

$$0.9\times t_1<t_{min}<1.1\times t_1,$$

where $t_1$ is a time for the meniscus of the ink to restore the exit level from the retreat position, and $t_{min}$ is a minimal period by which said ink jet print head discharges the drop of the ink.

*4. An ink jet print head comprising:*

*a substrate member formed with a heating resistor:*

*for defining an ink supply path including a heating zone in a vicinity of the heating resistor; and*

*an orifice plate member formed with an ink outlet communicating with the ink supply path and coupled to the ink path defining member,*

*said ink jet print head generating heat from the heating resistor to discharge a drop of the ink outlet,*

*said ink supply path having a fluid resistance so that a relationship is established such that:*

$$0<h<0.24\ (q/A),$$

*where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.*

*5. The ink jet print head according to claim 4, wherein another relationship is established such that:*

$$\pi\{(3q/4\pi)\}^{2/3}\leqq A\leqq\pi\{(3q/2\pi)\}^{2/3}.$$

*6. The ink jet print head according to claim 4, wherein another relationship is established such that:*

$$0.9\times t_1<t_{min}<1.1\times t_1$$

*where $t_1$ is a time for the meniscus of the ink to restore the exit level from the retreat position, and $t_{min}$ is a minimal period by which said ink jet print head discharges the drop of the ink.*

*7. An ink-jet print head comprising:*

*a substrate member formed with a heating resistor;*

*an ink path defining member provided on the substrate member for defining an ink supply path including a heating zone in a vicinity of the heating resistor; and*

*an orifice plate member formed with an ink outlet communicating with the ink supply path and coupled to the ink path defining member,*

*said ink jet print head generating heat from the heating resistor to discharge a drop of the ink outlet,*

*said ink jet print head generating heat from the heating resistor to discharge a drop of the ink outlet,*

*said ink supply path having a fluid resistance so that a relationship is established such that:*

$$0<h<0.21(q/A),$$

*where q is a quantity of the drop of the ink, A is a sectional area at an exit level of the ink outlet, and h is maximum projection that a meniscus of the ink has when it projects from the ink outlet after it has restored the exit level from a retreat position it had after the drop of the ink had been discharged.*

*8. The ink jet print head according to claim 7, wherein another relationship is established such that:*

$$\pi\{(3q/4\pi)\}^{2/3}\leqq A\leqq\pi\{(3q/2\pi)\}^{2/3}.$$

*9. The ink jet print head according to claim 7, wherein another relationship is established such that:*

$$0.9\times t_1<t_{min}<1.1\times t_1$$

*where $t_1$ is a time for the meniscus of the ink to restore the exit level from the retreat position, and $t_{min}$ is a minimal period by which said ink jet print head discharges the drop of the ink.*

10. An ink jet print head comprising:

a substrate member formed with a heating resistor;

an ink path defining member provided on the substrate member, for defining an ink supply path including a heating zone in a vicinity of the heating resistor, and an orifice plate member formed with an ink outlet communicating with the ink supply path and coupled to the ink path defining member, said ink jet print head generating heat from the heating resistor to discharge a drop of the ink outlet, said ink supply path having a fluid resistance so that a relationship is established such that:

$$0<h\leqq 0.2(q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

11. The ink jet print head according to claim 10, wherein another relationship is established such that:

$$\pi\{(3q/4\pi)\}^{2/3}\leqq A\leqq \pi\{(3q/2\pi)\}^{2/3}.$$

12. The ink jet print head according to claim 10, wherein another relationship is established such that:

$$0.9\times t_1<t_{min}<1.1\times t_1$$

where $t_1$ is a time for the meniscus of the ink to restore the exit level from the retreat position, and $t_{min}$ is a minimal period by which said ink jet print head discharges the drop of the ink.

13. An ink jet printing method for generating a drop of an ink from an ink outlet of an ink jet print head, said ink outlet being connected to an ink supply path on an substrate formed with a resistor in said ink jet printing head, said method comprising the steps of, heating said resistor for generating a bubble in said ink supply path to discharge the drop of the ink, and providing a fluid resistance in said ink supply path so that a relationship is established such that:

$$0<h<0.25\ (q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

14. The ink jet printing method according to claim 13, wherein said relationship is established such that:

$$0<h<0.24\ (q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

15. The ink jet printing method according to claim 13, wherein said relationship is established such that:

$$0<h<0.21\ (q/A),$$

where q is a quantity of the rop of the ink, A is a sectional area at an exit level of the ink outlet, and h is a maximum projection that a meniscus of the ink had when it projects from the ink outlet after it has restored the exit level from a retreat position it had after the drop of the ink had been discharged.

16. The ink jet printing method according to claim 13, wherein said relationship is established such that:

$$0<h\leqq 0.2\ (q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

17. An ink jet printing device for printing an image on a recording material by discharging a drop of an ink from an ink jet print head, wherein said ink-jet print head comprises;

a substrate member formed with a heating resistor;

an ink path defining member provided on the substrate member, for defining an ink supply path including a heating zone in a vicinity of the heating resistor; and an orifice plate member formed with an ink outlet communicating with the ink supply path and coupled to the ink path defining member, said ink jet print head generating heat from the heating resistor to discharge a drop of the ink outlet, said ink jet print head generating heat from the heating resistor to discharge a drop of the ink outlet, said ink supply path having a fluid resistance so that a relationship is established such that;

$$0<h<0.25\ (q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

18. The ink jet printing device according to claim 17, wherein said relationship is established such that;

$$0<h<0.24\ (q/A),$$

where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.

19. The ink jet printing device according to claim 17, wherein said relationship is established such that;

$$0<h<0.21\ (q/A),$$

where q is a quantity of the drop of the ink, A is a sectional area at an exit level of the ink outlet, and h is a

*maximum projection that at meniscus of the ink has when it projections from the ink outlet after it has restored the exit level form a retreat position it had after the drop of the ink had been discharged.*

*20. The ink jet printing device according to claim 17, wherein said relationship is such that:*

$$0<h\leqq 0.2\ (q/A),$$

*where q is a quantity of the drop of the ink, A is a sectional area at an exit level of the ink outlet, and h is a maximum projection that a meniscus of the ink has when it projects from the ink outlet after it has restored the exit level from a retreat position it had after the drop of the ink had been discharged.*

* * * * *